(12) United States Patent
Penn

(10) Patent No.: US 11,889,049 B2
(45) Date of Patent: Jan. 30, 2024

(54) GAIN MAP GENERATION WITH ROTATION COMPENSATION

(71) Applicant: Raytheon Company, Waltham, MA (US)

(72) Inventor: Matthew J. Penn, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 504 days.

(21) Appl. No.: 16/994,261

(22) Filed: Aug. 14, 2020

(65) Prior Publication Data

US 2022/0053178 A1    Feb. 17, 2022

(51) Int. Cl.
*H04N 19/119*    (2014.01)
*H04N 13/271*    (2018.01)
*H04N 5/262*    (2006.01)

(52) U.S. Cl.
CPC ......... *H04N 13/271* (2018.05); *H04N 5/2628* (2013.01); *G06T 2200/28* (2013.01)

(58) Field of Classification Search
CPC .... H04N 13/243; H04N 5/247; H04N 13/271; H04N 5/2628; G06T 17/20; G06T 5/50; G06T 5/005; G06T 7/74; G06T 3/4038; A61B 3/0008
USPC ........................................ 382/296; 348/218.1
See application file for complete search history.

(56) References Cited

U.S. PATENT DOCUMENTS

| | | | |
|---|---|---|---|
| 6,931,163 B1 | 8/2005 | Wechgeln | |
| 7,856,154 B2 | 12/2010 | Young | |
| 8,213,710 B2 | 7/2012 | Dosluoglu | |
| 8,369,579 B2 | 2/2013 | Frigerio | |
| 8,660,421 B2 | 2/2014 | Staker et al. | |
| 9,955,070 B2 | 4/2018 | Lelescu et al. | |
| 9,972,101 B2 | 5/2018 | Bishop et al. | |
| 2010/0020933 A1 | 1/2010 | Topfer et al. | |
| 2013/0329033 A1 | 12/2013 | Shibata et al. | |
| 2014/0027620 A1 | 1/2014 | Takeda | |
| 2014/0044232 A1 | 2/2014 | Liu | |
| 2016/0124209 A1 | 5/2016 | Arai | |
| 2017/0061584 A1* | 3/2017 | Lim | G06T 5/002 |
| 2017/0070673 A1* | 3/2017 | Lelescu | G06T 7/80 |
| 2018/0150684 A1 | 5/2018 | Wang et al. | |
| 2018/0330472 A1 | 11/2018 | Elhage et al. | |
| 2018/0357796 A1 | 12/2018 | Bishop et al. | |

(Continued)

OTHER PUBLICATIONS

Boerner et al., "Initial Calibration of the Atmospheric Imaging Assembly (AIA) on the Solar Dynamics Observatory (SDO)", Solar Physics, Jul. 2011, 26 pages.

(Continued)

*Primary Examiner* — Phuoc H Doan

(57) ABSTRACT

A method includes obtaining multiple input images of a scene based on image data captured using multiple imaging sensors. The method also includes generating a gain map identifying relative gains of the imaging sensors. The gain map is generated using the input images and translational and rotational offsets between one or more pairs of the input images. Generating the gain map may include using, for each pair of the input images, a rotation matrix based on a rotation angle between the pair of the input images. The method may further include using the gain map to process additional image data captured using the imaging sensors.

20 Claims, 4 Drawing Sheets

(56) References Cited

U.S. PATENT DOCUMENTS

2019/0026865 A1    1/2019  Cohen et al.
2020/0025850 A1    1/2020  Zeller et al.

OTHER PUBLICATIONS

Kuhn et al., "Gain Calibrating Nonuniform Image-Array Data Using Only The Image Data", Publication of the Astronomical Society of the Pacific, Oct. 1991, 12 pages.
Caron et al., "Extracting flat-field images from scene-based image sequences using phase correlation", Review of Scientific Instruments, Jun. 2016, 5 pages.
Toussaint et al., "Improved Convergence for CCD Gain Calibration Using Simultaneous-Overrelaxation Techniques", The Astronomical Journal, Aug. 2003, 7 pages.
Xu et al., "Flat-Fielding of Solar Hα Observations Based on the Maximum Correntropy Criterion", The Astrophysical Journal, Aug. 2016, 10 pages.
Final Office Action dated May 26, 2022 in connection with U.S. Appl. No. 16/993,663, 34 pages.
Non-Final Office Action dated Apr. 6, 2022 in connection with U.S. Appl. No. 16/993,663, 35 pages.

\* cited by examiner

GAIN MAP GENERATION WITH ROTATION COMPENSATION

TECHNICAL FIELD

This disclosure relates generally to image processing systems. More specifically, this disclosure relates to gain map generation with rotation compensation.

BACKGROUND

An imaging system often uses an array of imaging sensors to capture images of scenes. For example, an imaging system may use a two-dimensional array of imaging sensors to capture images of the sky, Earth, or space. However, in various imaging systems, different imaging sensors in an array may generate different output values even when receiving the exact same inputs. For instance, different imaging sensors may output different values even when viewing a completely uniform portion of the sky, Earth, or space. This is often due to the different imaging sensors having different gains, which causes the imaging sensors to output different values.

SUMMARY

This disclosure provides gain map generation with rotation compensation.

In a first embodiment, a method includes obtaining multiple input images of a scene based on image data captured using multiple imaging sensors. The method also includes generating a gain map identifying relative gains of the imaging sensors. The gain map is generated using the input images and translational and rotational offsets between one or more pairs of the input images.

In a second embodiment, an apparatus includes at least one memory configured to store multiple input images of a scene based on image data captured using multiple imaging sensors. The apparatus also includes at least one processor configured to generate a gain map identifying relative gains of the imaging sensors. To generate the gain map, the at least one processor is configured to use the input images and translational and rotational offsets between one or more pairs of the input images.

In a third embodiment, a non-transitory computer readable medium contains instructions that when executed cause at least one processor to obtain multiple input images of a scene based on image data captured using multiple imaging sensors. The medium also includes instructions that when executed cause the at least one processor to generate a gain map identifying relative gains of the imaging sensors. The instructions that when executed cause the at least one processor to generate the gain map include instructions that when executed cause the at least one processor to use the input images and translational and rotational offsets between one or more pairs of the input images.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 5, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, an imaging system often uses an array of imaging sensors to capture images of scenes, such as when an imaging system uses a two-dimensional array of imaging sensors to capture images of the sky, Earth, or space. However, in various imaging systems, different imaging sensors in an array may generate different output values even when receiving the exact same inputs. For instance, different imaging sensors may output different values even when viewing a completely uniform portion of the sky, Earth, or space. This is often due to the different imaging sensors having different gains, which causes the imaging sensors to output different values.

Various approaches have been developed to generate a "gain map" for an array or other collection of imaging sensors, where the gain map identifies relative gains of the imaging sensors. In other words, these approaches can be used to generate a gain map that identifies the spatial nonuniformity of the imaging sensors. Some of these approaches operate using multiple images of a scene, where the images are spatially displaced from one another. This means that the input images are "translated" or shifted in the x and y directions so that the images are not captured of the exact same portion of the scene. One benefit of these approaches is that a gain map can be generated directly from images that are captured using imaging sensors and without requiring the use of a special reference (such as a uniformly-illuminated scene).

Unfortunately, analysis has shown that these approaches can often fail to generate a gain map successfully if the input images are rotated as well as being translated. Even small amounts of rotation in the input images can cause these approaches to fail to converge, meaning even small amounts of rotation may prevent a gain map from being generated. This disclosure provides for gain map generation with rotation compensation. As described below, a gain map generation process incorporates a consideration of image rotation in addition to image translation when generating a gain map for an array or other collection of imaging sensors. As a result, the gain map generation process can be more accurate and effectively used in a given application, even with the presence of image rotation.

Figure 1:
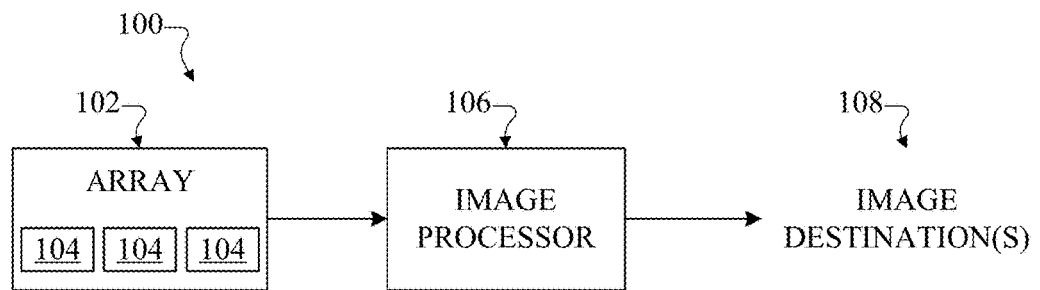
FIG. 1 illustrates an example system supporting gain map generation with rotation compensation in accordance with this disclosure.

FIG. 1 illustrates an example system 100 supporting gain map generation with rotation compensation in accordance with this disclosure. As shown in FIG. 1, the system 100 includes an array 102 of imaging sensors 104 and an image processor 106. The array 102 represents a collection of multiple imaging sensors 104, which are used to generate image data defining captured images of scenes. Each imaging sensor 104 represents a device configured to generate at least one pixel of image data. The array 102 may include any suitable number of imaging sensors 104 in any suitable arrangement. In some cases, for instance, the array 102 may include a two-dimensional arrangement of imaging sensors 104, and the imaging sensors 104 may be arranged in rows and columns. Each imaging sensor 104 includes any suitable structure configured to generate outputs based on incoming illumination, such as a charge-coupled device (CCD), a complementary metal oxide semiconductor (CMOS) device, or a charge injection device (CID). Note that the imaging sensors 104 may be used to generate images in any suitable wavelength range(s), such as visible, infrared, and/or ultraviolet images.

The image processor 106 processes the image data generated by the array 102 of imaging sensors 104 in order to generate images of scenes. For example, the image processor 106 can operate to convert output values generated by the imaging sensors 104 into visible, infrared, and/or ultraviolet images of scenes. The resulting images can be used by the image processor 106 to perform one or more functions, or the resulting images can be output to one or more destinations 108 for storage or use. Note that images of scenes may be used for numerous purposes, and this disclosure is not limited to any particular use of the images.

As described in more detail below, the image processor 106 supports a gain map generation process that is used to generate one or more gain maps for the array 102 of imaging sensors 104. The gain map generation process incorporates a consideration of image rotation in addition to image translation when generating a gain map for the array 102 of imaging sensors 104. For example, the gain map generation process can identify an angle of rotation between a pair of images being used to generate a gain map, and the angle of rotation can be used to compensate for a rotational offset of the images.

Although FIG. 1 illustrates one example of a system 100 supporting gain map generation with rotation compensation, various changes may be made to FIG. 1. For example, the image processor 106 may be coupled to or otherwise used with multiple arrays 102 of imaging sensors 104. Also, the functionality of the image processor 106 may be divided into multiple physical components, such as when one or more components process image data from the imaging sensors 104 to generate images and when one or more other components process the generated images to identify gain maps.

Figure 2:
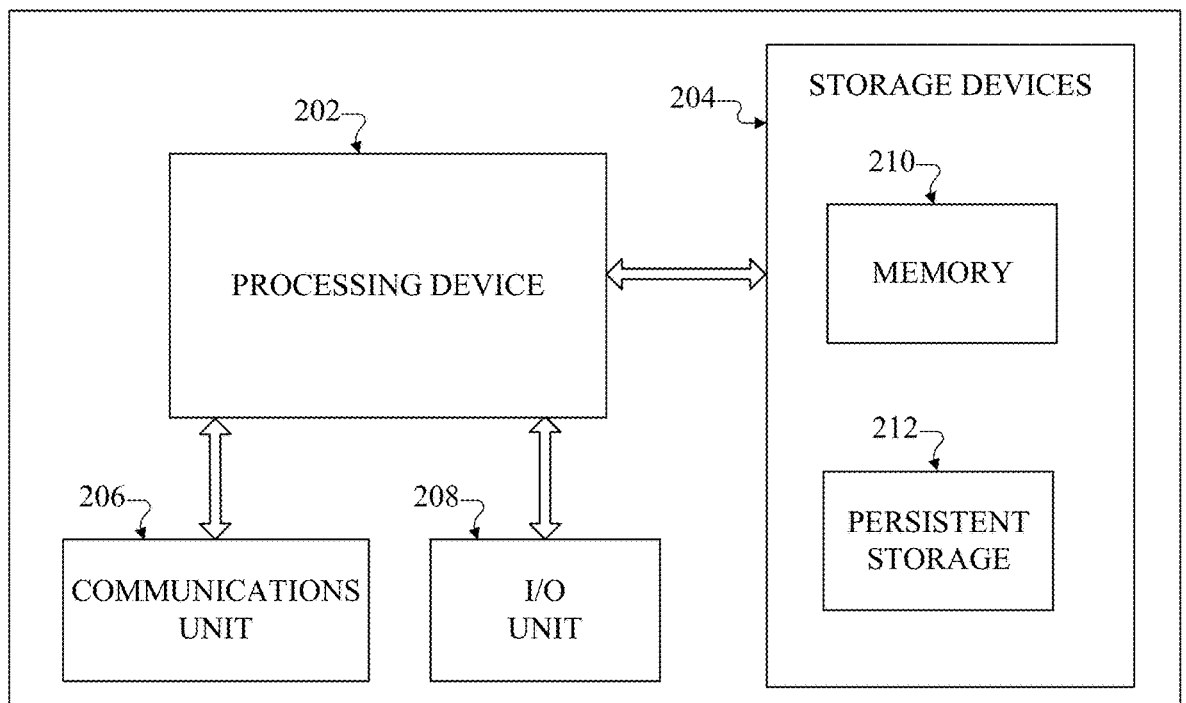
FIG. 2 illustrates an example device supporting gain map generation with rotation compensation in accordance with this disclosure.

FIG. 2 illustrates an example device 200 supporting gain map generation with rotation compensation in accordance with this disclosure. One or more instances of the device 200 may, for example, be used to at least partially implement the functionality of the image processor 106 of FIG. 1. However, the functionality of the image processor 106 may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device(s) 202 may execute instructions that can be loaded into at least one memory 210. The one or more processing devices 202 include any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices, such as the array 102 of imaging sensors 104 or the one or more destinations 108. For example, the communications unit 206 can include a network interface card or a wireless transceiver facilitating communications over a wired or wireless network or other communication link(s). The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement the functionality of the image processor 106. Thus, for example, the instructions executed by the processing device 202 may cause the device 200 to obtain multiple spatially-displaced input images, where at least one of the input images may be rotated relative to another of the input images. The instructions executed by the processing device 202 may also cause the device 200 to generate a gain map using the input images and, if necessary, compensate for rotation in the input images when generating the gain map. The instructions executed by the processing device 202 may further cause the device 200 to output or use the gain map, such as to process additional image data captured using the imaging sensors 104 (like compensating the additional image data for the spatial nonuniformity of the imaging sensors 104).

Although FIG. 2 illustrates one example of a device 200 supporting gain map generation with rotation compensation, various changes may be made to FIG. 2. For example, computing and processing devices and systems come in a wide variety of configurations, and FIG. 2 does not limit this disclosure to any particular computing or processing device or system.

Figure 3A:
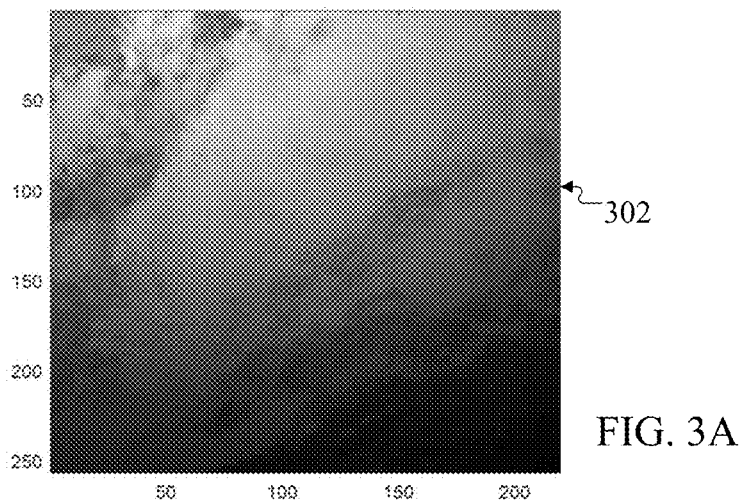
FIGS. 3A through 3C illustrate example input images for use in gain map generation with rotation compensation in accordance with this disclosure.
Figure 3B:
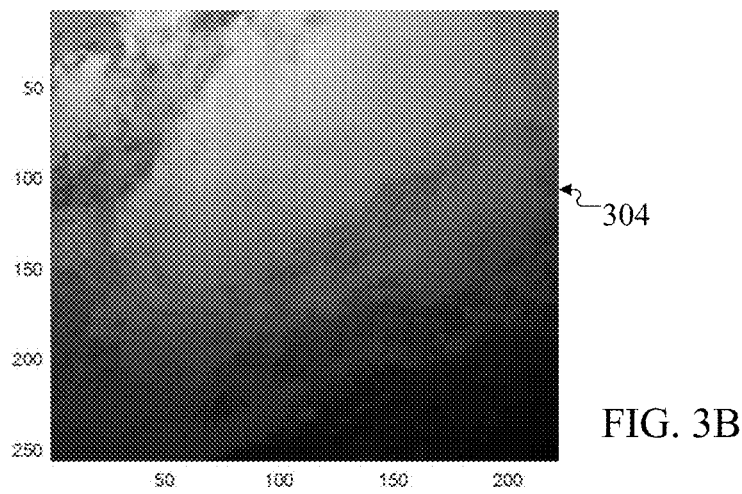
Figure 3C:
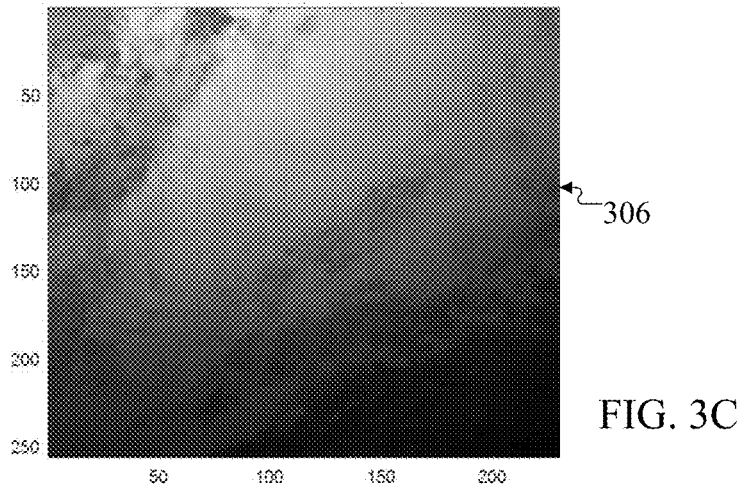

FIGS. 3A through 3C illustrate example input images 302, 304, 306 for use in gain map generation with rotation compensation in accordance with this disclosure. For ease of explanation, the input images 302, 304, 306 are described as being captured using the array 102 of imaging sensors 104 and processed using the image processor 106 (which may be implemented using the device 200 of FIG. 2) in the system 100 of FIG. 1. However, the input images 302, 304, 306 may be generated using any suitable imaging device(s) and processed using any suitable image processing device(s) in any suitable system(s).

As shown in FIGS. 3A through 3C, the input images 302, 304, 306 represent spatially-displaced images captured of the same scene. That is, the input images 302, 304, 306 capture different overlapping portions of the same scene. This can be achieved in various ways, such as by moving the array 102 of imaging sensors 104 on a larger device or system (such as an airplane, satellite, or other vehicle) or moving the larger device or system itself so that the array 102 views different portions of the same scene. Each input image 302, 304, 306 can be captured using any suitable image capture settings, such as any suitable exposure and any suitable resolution.

Various techniques may be used to generate a gain map for imaging sensors 104 that capture a collection of input images 302, 304, 306. One example approach that has been developed and that may be used here (with modification as described below) is the technique described by Kuhn, Lin, & Loranz, "Gain Calibrating Nonuniform Image-Array Data Using Only The Image Data," Publications of the Astronomical Society of the Pacific, Vol. 103, No. 668, October 1991, pages 1097-1108 (which is hereby incorporated by reference in its entirety). This approach is sometimes referred to as the "KLL" technique. Another example approach that has been developed and that may be used here (with modification as described below) is the technique described by Toussaint, Harvey, & Toussaint, "Improved Convergence for the CCD Gain Calibration Using Simultaneous-Overrelaxation Techniques," The Astronomical Journal, Vol. 126, No. 2, August 2003, pages 1112-1118 (which is hereby incorporated by reference in its entirety). This approach applies an analytic solution method called the "SOR" technique to the basic KLL algorithm. However, note that any other suitable technique may be used here to produce gain maps.

The input images 302, 304, 306 here can be associated with some amount of rotation in addition to some amount of translation. In this particular example, for instance, the input image 304 may be rotated about two degrees relative to the input image 302, and the input image 306 may be rotated about four degrees relative to the input image 302. As noted above, even small amounts of rotation like this may prevent a gain map generation algorithm from converging and successfully generating a gain map.

In accordance with this disclosure, a gain map generation process is designed or modified to account for rotation of the input images 302, 304, 306 as well as for translation of the input images 302, 304, 306 when generating a gain map. For example, in the gain map generation process, it may be assumed that dark current and bias values have been removed from the input images 302, 304, 306 with suitable pre-processing. "Dark current" values refer to values generated by the presence of unwanted electrons in imaging sensors 104 due to thermal energy, and "bias" values refer to values applied to the imaging sensors 104 to control their output values. With these effects removed from the input images 302, 304, 306, the gain map generation process can use the input images 302, 304, 306 to generate a gain map.

In some embodiments, the gain map generation process may occur as follows. For each pixel (denoted x) of each input image 302, 304, 306, a detected intensity (denoted d) can be expressed in terms of the pixel gain (denoted g) and the input scene intensity (denoted s) in the image as follows:

$$d_i(x) = g(x) \times s_i(x)$$

Here, the subscript i represents the image number of the input image in a sequence of images from 1 to N, and x represents a pixel at coordinates (x, y). Each of the input images 302, 304, 306 may be translated from the other input images by offsets (Δx, Δy) so that:

$$d_i(x+a_i) = g(x+a_i) \times s_i(x+a_i)$$

$$d_j(x+a_j) = g(x+a_j) \times s_j(x+a_j)$$

Here, $a_i = (\Delta x_i, \Delta y_i)$ represents the translation between a first input image and a second input image, and $a_j = (\Delta x_j, \Delta y_j)$ represents the translation between the first input image and a third input image. An assumption in this process is that the intensity of the observed scene at each pixel s remains constant so that:

$$s_i(x+a_i) = s(x)$$

$$s_j(x+a_j) = s(x)$$

This means that pixels of the same point in a scene in different images of the scene should have the same intensity regardless of the translation of the input images. As a result, a ratio of the measured intensity at each pixel in shift-corrected images is only dependent upon the ratio of the pixel gains, which can be expressed as follows:

$$d_i(x+a_i)/d_j(x+a_j) = g(x+a_i)/g(x+a_j)$$

This information can be further processed according to known techniques in order to generate the gain map for the imaging sensors 104.

Rotational image motion preserves flux from the scene as measured at each element of the array 102. Assuming intensity per pixel is constant, this means that pixel intensity is preserved during a rotational offset as well as during a translational offset of the input images 302, 304, 306. Thus, rotational image motion can be included within the gain map generation process along with translational image motion. In some embodiments, to include consideration of image rotation in the gain map generation process, the offsets $a_i$ between two input images can be calculated using a measured image rotational angle θ between the two input images as follows:

$$a_i = R(\theta)x + \Delta x$$

where R(θ) is a rotation matrix defined as:

$$R(\theta) = \begin{bmatrix} \cos\theta & -\sin\theta \\ \sin\theta & \cos\theta \end{bmatrix}$$

Here, Δx corresponds to the translational change in pixel location of the same point of a scene in the two input images. This allows identification of new pixel locations for a particular part of an image scene using both translation and rotation.

Figure 4:
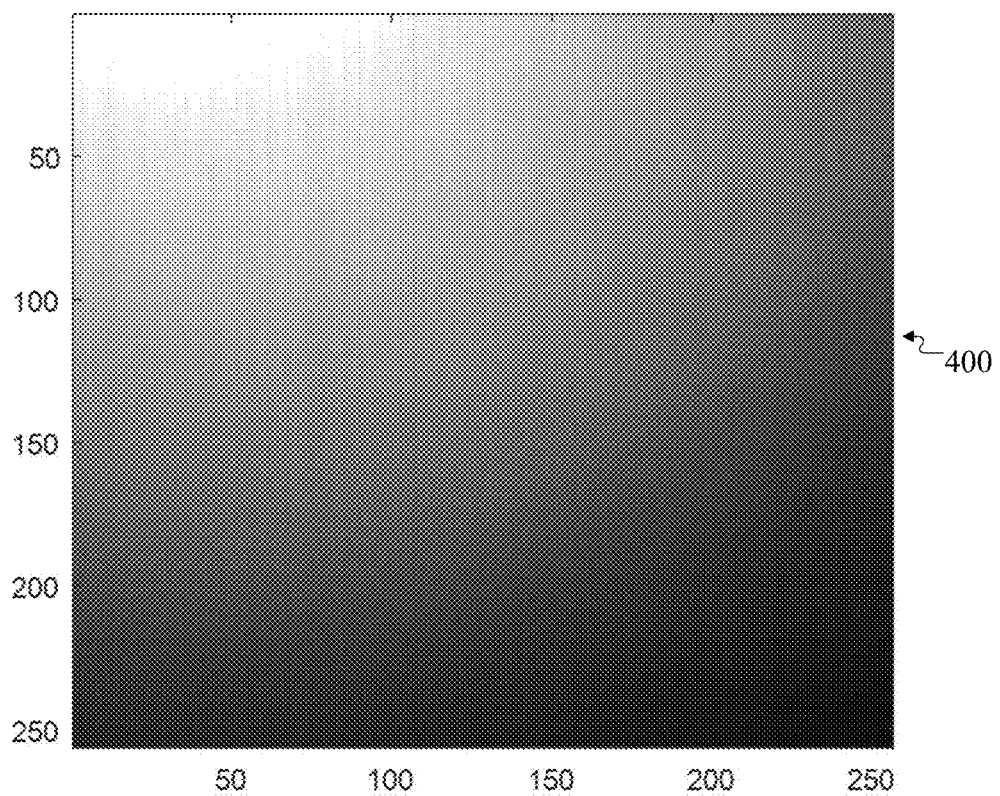
FIG. 4 illustrates an example gain map generated using rotation compensation in accordance with this disclosure.

FIG. 4 illustrates an example gain map 400 generated using rotation compensation in accordance with this disclosure. The gain map 400 in FIG. 4 is generated using the input images 302, 304, 306, even though the input images 302, 304, 306 include rotational differences as well as translational differences. Note that while the gain map 400 is generated here based on three input images 302, 304, 306, any suitable number of input images may be used here, such as two or more than three input images.

Although FIGS. 3A through 3C illustrate one example of input images 302, 304, 306 images for use in gain map generation with rotation compensation, various changes may be made to FIGS. 3A through 3C. For example, the contents of the input images 302, 304, 306 are merely for illustration and explanation, and the contents of input images used in any particular implementation can vary widely. Although FIG. 4 illustrates one example of a gain map 400 generated using rotation compensation, various changes may be made to FIG. 4. For example, the contents of the gain map 400 are merely for illustration and explanation, and the contents of a gain map produced in any particular implementation can vary widely.

Figure 5:
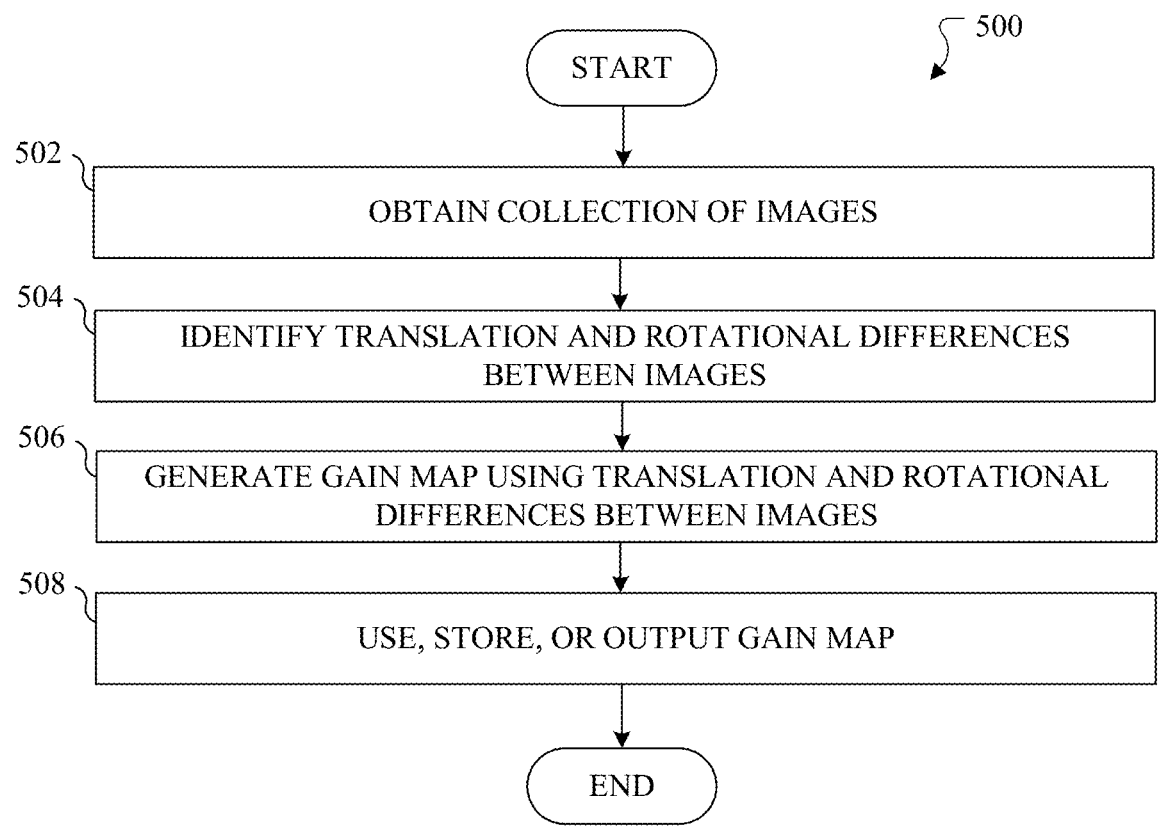
FIG. 5 illustrates an example method for gain map generation with rotation compensation in accordance with this disclosure.

FIG. 5 illustrates an example method 500 for gain map generation with rotation compensation in accordance with this disclosure. For ease of explanation, the method 500 is described as being performed using the image processor 106 of FIG. 1, which may be implemented using the device 200 of FIG. 2. However, the method 500 may be performed using any suitable device(s) in any suitable system(s).

As shown in FIG. 5, a collection of input images is obtained at step 502. This may include, for example, the image processor 106 obtaining image data from the array 102 of imaging sensors 104 and generating multiple spatially-displaced (and possibly rotationally-displaced) input images. Note, however, that the image processor 106 may also obtain the collection of input images from another source, such as from storage or from another device that generates the input images.

Translational and rotational differences between the input images are identified at step 504. This may include, for example, the image processor 106 processing the input images to identify translational offsets in x and y directions between each pair of input images and a rotational offset θ between each pair of input images. A gain map is generated using (among other things) the translational and rotational differences between the input images at step 506. This may include, for example, the image processor 106 using the various equations provided above to identify pixel values in a gain map based on the contents of the input images and the translational and rotational differences. The gain map can be used, stored, or output in any suitable manner at step 508. This may include, for example, the image processor 106 storing the final gain map in a memory, using the final gain map to perform some function, or outputting the final gain map to one or more destinations 108.

Although FIG. 5 illustrates one example of a method 500 for gain map generation with rotation compensation, various changes may be made to FIG. 5. For example, while shown as a series of steps, various steps in FIG. 5 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining multiple input images of a scene based on image data captured using multiple imaging sensors; and
   generating a gain map identifying relative gains of the imaging sensors, the gain map generated using the input images and translational and rotational offsets between one or more pairs of the input images.

2. The method of claim 1, wherein:
   the multiple input images of the scene comprise at least three images of the scene; and
   the translational and rotational offsets comprise translational and rotational offsets between multiple pairs of the input images.

3. The method of claim 1, wherein generating the gain map comprises using, for each pair of the input images, a rotation matrix based on a rotation angle between the pair of the input images.

4. The method of claim 1, wherein the translational and rotational offsets between each pair of the input images are defined as:

$$a_i = R(\theta)x + \Delta x$$

where $a_i$ represents a total offset associated with the $i^{th}$ input image relative to another input image, x represents coordinates of each pixel in the $i^{th}$ input image, $\Delta x$ represents a translational change in the coordinates of each pixel in the $i^{th}$ input image relative to the other input image, $R(\theta)$ is a rotation matrix defined as:

$$R(\theta) = \begin{bmatrix} \cos\theta & -\sin\theta \\ \sin\theta & \cos\theta \end{bmatrix},$$

and
$\theta$ represents a rotation angle between the pair of the input images.

5. The method of claim 1, wherein the input images are based on the image data captured using a two-dimensional array of the imaging sensors.

6. The method of claim 1, wherein the gain map identifies spatial nonuniformity of the imaging sensors.

7. The method of claim 1, further comprising:
using the gain map to process additional image data captured using the imaging sensors.

8. An apparatus comprising:
at least one memory configured to store multiple input images of a scene based on image data captured using multiple imaging sensors; and
at least one processor configured to generate a gain map identifying relative gains of the imaging sensors;
wherein, to generate the gain map, the at least one processor is configured to use the input images and translational and rotational offsets between one or more pairs of the input images.

9. The apparatus of claim 8, wherein:
the multiple input images of the scene comprise at least three images of the scene; and
the translational and rotational offsets comprise translational and rotational offsets between multiple pairs of the input images.

10. The apparatus of claim 8, wherein, to generate the gain map, the at least one processor is configured to use, for each pair of the input images, a rotation matrix based on a rotation angle between the pair of the input images.

11. The apparatus of claim 8, wherein the translational and rotational offsets between each pair of the input images are defined as:

$$a_i = R(\theta)x + \Delta x$$

where $a_i$ represents a total offset associated with the $i^{th}$ input image relative to another input image, x represents coordinates of each pixel in the $i^{th}$ input image, $\Delta x$ represents a translational change in the coordinates of each pixel in the $i^{th}$ input image relative to the other input image, $R(\theta)$ is a rotation matrix defined as:

$$R(\theta) = \begin{bmatrix} \cos\theta & -\sin\theta \\ \sin\theta & \cos\theta \end{bmatrix},$$

and
$\theta$ represents a rotation angle between the pair of the input images.

12. The apparatus of claim 8, wherein the input images are based on the image data captured using a two-dimensional array of the imaging sensors.

13. The apparatus of claim 8, wherein the gain map identifies spatial nonuniformity of the imaging sensors.

14. The apparatus of claim 8, wherein the at least one processor is further configured to use the gain map to process additional image data captured using the imaging sensors.

15. A non-transitory computer readable medium containing instructions that when executed cause at least one processor to:
obtain multiple input images of a scene based on image data captured using multiple imaging sensors; and
generate a gain map identifying relative gains of the imaging sensors;
wherein the instructions that when executed cause the at least one processor to generate the gain map comprise:
instructions that when executed cause the at least one processor to use the input images and translational and rotational offsets between one or more pairs of the input images.

16. The non-transitory computer readable medium of claim 15, wherein:
the multiple input images of the scene comprise at least three images of the scene; and
the translational and rotational offsets comprise translational and rotational offsets between multiple pairs of the input images.

17. The non-transitory computer readable medium of claim 15, wherein the instructions that when executed cause the at least one processor to generate the gain map comprise:
instructions that when executed cause the at least one processor to use, for each pair of the input images, a rotation matrix based on a rotation angle between the pair of the input images.

18. The non-transitory computer readable medium of claim 15, wherein the translational and rotational offsets between each pair of the input images are defined as:

$$a_i = R(\theta)x + \Delta x$$

where $a_i$ represents a total offset associated with the $i^{th}$ input image relative to another input image, x represents coordinates of each pixel in the $i^{th}$ input image, $\Delta x$ represents a translational change in the coordinates of each pixel in the $i^{th}$ input image relative to the other input image, $R(\theta)$ is a rotation matrix defined as:

$$R(\theta) = \begin{bmatrix} \cos\theta & -\sin\theta \\ \sin\theta & \cos\theta \end{bmatrix},$$

and
$\theta$ represents a rotation angle between the pair of the input images.

19. The non-transitory computer readable medium of claim 15, wherein the input images are based on the image data captured using a two-dimensional array of the imaging sensors.

20. The non-transitory computer readable medium of claim 15, wherein the gain map identifies spatial nonuniformity of the imaging sensors.

* * * * *